Mar. 6, 1923.  1,447,169
W. E. BEE
TROLLEY
Filed Dec. 5, 1921   2 sheets-sheet 1
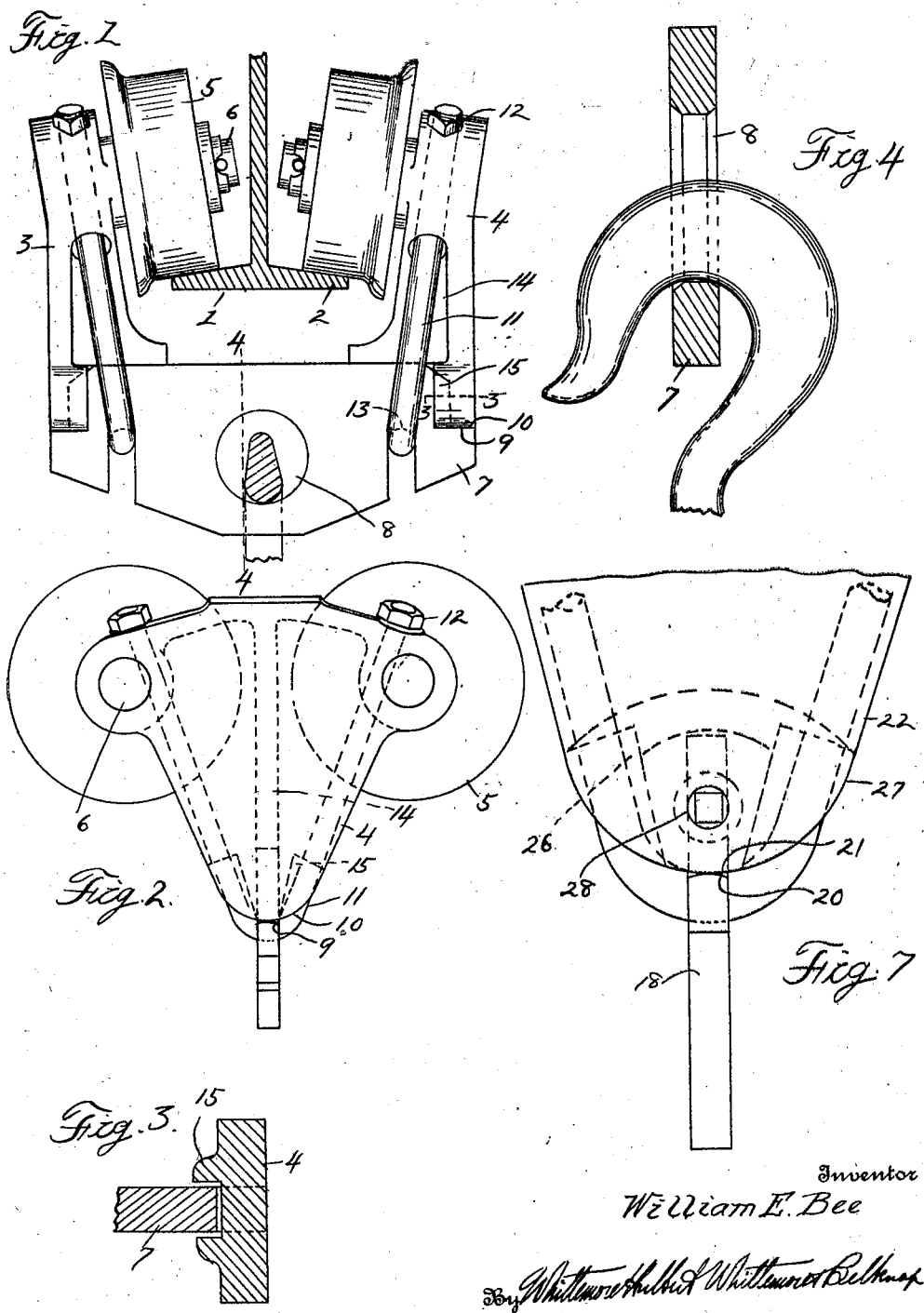

Mar. 6, 1923.
W. E. BEE
TROLLEY
Filed Dec. 5, 1921
1,447,169
2 sheets-sheet 2
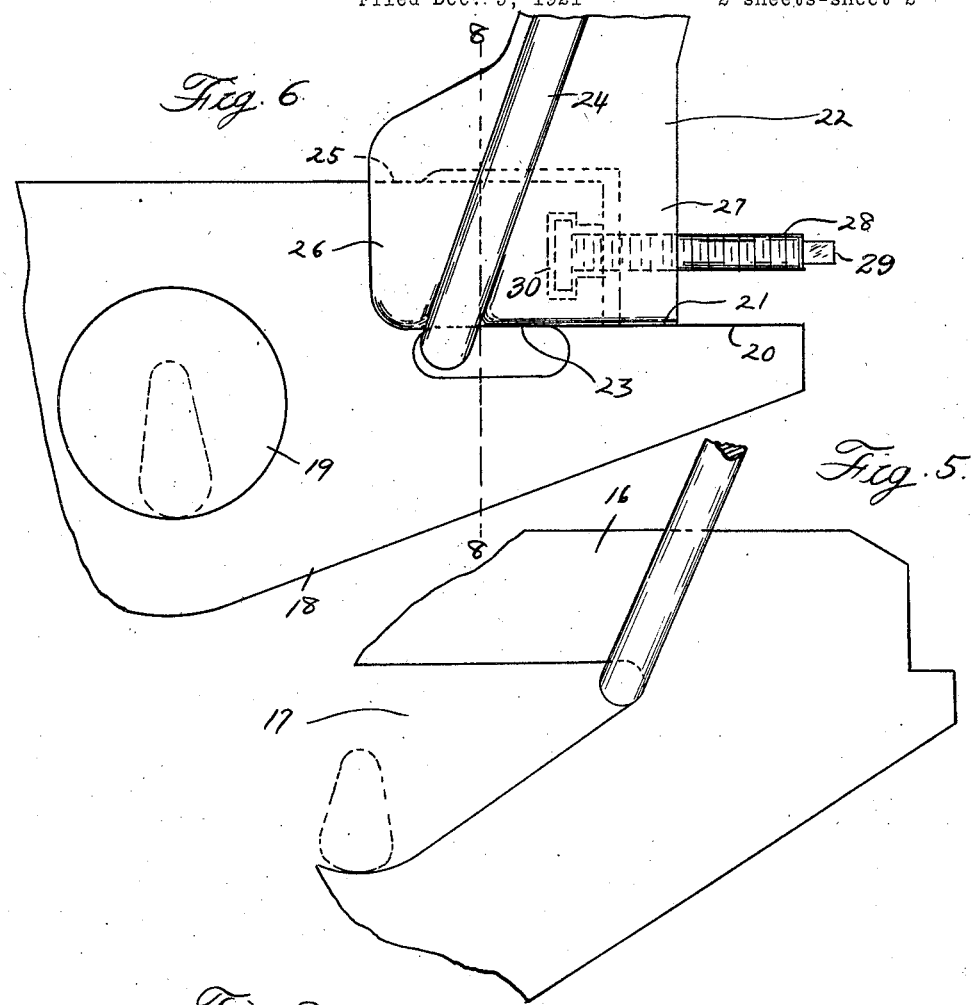
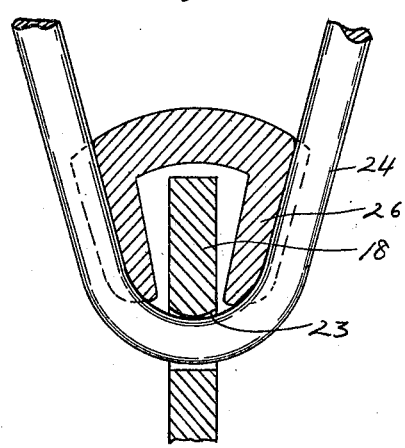
Inventor
William E. Bee
Attorneys Patented Mar. 6, 1923.

1,447,169

UNITED STATES PATENT OFFICE.

WILLIAM E. BEE, OF DETROIT, MICHIGAN, ASSIGNOR TO PALMER-BEE COMPANY, OF DETROIT, MICHIGAN, A CORPORATION OF MICHIGAN.

TROLLEY.

Application filed December 5, 1921. Serial No. 519,863.

*To all whom it may concern:*

Be it known that I, WILLIAM E. BEE, a citizen of the United States of America, residing at Detroit, in the county of Wayne and State of Michigan, have invented certain new and useful Improvements in Trolleys, of which the following is a specification, reference being had therein to the accompanying drawings.

The invention relates to trolleys and refers particularly to the overhead type of trolley which travels upon an elevated track formed by the flanges of an I-beam or the like. One object of the invention is the provision of a simple construction of trolley having but few parts which may be manufactured at low cost and readily assembled. With this and other objects in view, the invention resides in the novel features of construction and combinations and arrangements of parts as more fully hereinafter set forth.

In the drawings:

Figure 1 is a front elevation of a trolley embodying my invention;

Figure 2 is a side elevation thereof;

Figures 3 and 4 are cross sections, respectively on lines 3—3 and 4—4 of Figure 1;

Figure 5 is a front elevation of a portion of a modified construction of cross bar;

Figure 6 is a front elevation of a portion of a modified construction of trolley;

Figure 7 is a side view thereof;

Figure 8 is a cross section on the line 8—8 of Figure 6.

1 is a track which as shown in the present instance is formed by the lower flanges 2 of an I-beam. The trolley frame comprises the side frames 3 and 4 which are substantially triangular in elevation and which are suspended by means of the traction wheels 5 travelling upon the flanges 2 forming the track and journalled upon the studs 6 extending transversely inward from the side frames near their upper ends. 7 is a cross bar extending between the side frames 3 and 4 and provided with a central aperture 8 for engagement with a hook or the like for carrying the load. This cross bar performs the double function of a tie bar for the side frames and a clevis for the load.

The cross bar has at its opposite ends the upwardly facing longitudinally extending bearings 9 which are rounded and abut the downwardly facing rounded bearings 10 at the lower ends of the side frames 3 and 4. To secure the cross bar to the side frames there are the U-shaped tension rods 11 which embrace the cross bar 7, passing through upwardly extending slots therein, and are secured at their ends to the side frames by the nuts 12 resting upon the upper edges of the side frames. These tension rods form the sole connection between the side frames and the cross bar and place the side frames under compression. To permit of rocking movement of the cross bar relative to the side frames, the bearings 13 upon the cross bar, engaged by the bases of the U-shaped tension rods, are in horizontal alignment with the bearings 9 and are preferably rounded in a direction transverse to the cross bar.

To prevent inward swinging of the side frames relative to the cross bar and about the bearings 13, which are inwardly offset relative to the bearings 9, when the trolley is not in engagement with its track, I have provided each of the trolley frames with the web 14 which abuts the upper edge of the cross bar above the bearings 13 and also preferably longitudinally inward beyond this point.

To limit the amount of rocking movement of the cross bar relative to the side frames, each of the latter has the upwardly diverging wings 15 which embrace that portion of the end of the cross bar above the bearing 9.

As shown in Figure 5, the cross bar 16 is of the same general construction as the cross bar 7 with the exception that the opening 17 engaged in by the load carrying hook is triangular in shape so that the U-shaped tension rods engage in the upper apices of this opening.

In the modified construction of Figures 6, 7 and 8, the trolley is of the adjustable type in which the side frames are adjustable longitudinally of the cross bar so that the trolley may engage different sizes of track. The cross bar 18 has the centrally located opening 19 for engagement with the load carrying hook and has at each of its ends the upwardly facing longitudinally extending rounded bearings 20 for abutting downwardly facing rounded bearings 21 upon the side frames 22 of the trolleys. The cross bar also has near its ends and inwardly offset from the bearings 20, the downwardly facing bearings 23 for engagement with the U-shaped tension rods 24, forming the sole connection between the side frames and the cross bar. The bearings 20 and 23 are however, of greater length longitudinally of the cross bar to permit of movement of the side frames with the U-shaped tension rods longitudinally of the cross bar. Each side frame has on its inner side the bearing portion 25 for abutting the upper edge of the cross bar longitudinally inward beyond the point above the bearing 23 to thereby prevent inward rocking movement of the side frame relative to the cross bar. Furthermore, each side frame has the depending side flanges 26 which embrace the upper portion of the cross bar and permit of limited rocking movement thereof relative to the side frames. The downwardly facing bearing 21 is upon an end portion 27 of each side frame connecting the depending side flanges 26 at their outer ends. To adjust each side frame with its U-shaped tension rod longitudinally upon the cross bar, there is the threaded member 28 threadedly engaging the end 27 and having its head 29 located in a T-slot 30 in the end portion of the cross bar above the bearing 20. With this arrangement, rotation of the threaded member 28 moves the side frame and with it the U-shaped tension rod, the lower end of which latter engages in recesses in the depending side flanges 26.

From the above description it will be seen that I have provided a very simple construction of trolley having but few parts which may be manufactured at low cost and easily assembled. The cross bar between the side frames forms a tie connection therebetween and also the clevis. Also the U-shaped tension rods form the sole connection between the side frames and the cross bar and place the side frames under compression. Further, I have provided an arrangement which permits of limited rocking movement of the cross bar relative to the side frames so that the load upon the traction wheels is equalized and which permits of adjusting the side frames toward and away from each other so that the trolley may fit different sized tracks.

What I claim as my invention is:

1. In a trolley, the combination with a frame, of a load carrying member abutting said frame, and a tension member forming the sole load connection between said load carrying member and frame and placing the said frame under compression.

2. In a trolley, the combination with a suspended frame, of a rockable load carrying member having substantially horizontally-aligned bearings, one of said bearings engaging said load carrying member, and a tension member engaging the other of said bearings and forming the sole load connection between said load carrying member and frame.

3. In a trolley, the combination with a frame having a traction member secured thereto near its upper edge and to one side thereof, of a load carrying member abutting said frame, a tension member engaging said load carrying member at one side of the point of engagement of said load carrying member and frame and forming the sole load connection between said load carrying member and frame, and means upon said frame adapted to abut said load carrying member on the side of the point of engagement of said tension member and load carrying member opposite to the point of engagement of said frame and load carrying member, whereby rotation of said frame about the point of engagement of said tension member with said load carrying member as a pivot is prevented.

4. In a trolley, the combination with a frame, of a rockable load carrying member abutting said frame, a tension member forming the sole load connection between said load carrying member and frame, and cooperating means upon said fame and load carrying member for limiting the rocking movement of said load carrying member relative to said frame.

5. In a trolley, the combination with a pair of suspended side frames, of a cross bar extending therebetween and having upwardly facing bearings at its ends for abutting said side frames and downwardly facing bearings in substantial horizontal alignment with said upwardly facing bearings, and U-shaped tension rods engaging said downwardly facing bearings and forming the sole load connections between said cross bar and side frames, the bases of said U-shaped members constituting bearings for said cross bar.

6. In a trolley, the combination with a pair of side frames, of a cross bar abutting said side frames, tension members forming the sole load connections between said cross bar and side frames and placing said side frames under compression, and means for adjusting said side frames longitudinally of said cross bar.

7. In a trolley, the combination with a pair of suspended side frames, of a cross bar having at its opposite ends upwardly facing longitudinally extending bearings for abutting said side frames, U-shaped tension members connecting said rock bar to said side frames, the bases of said U-shaped members passing through longitudinally extending elongated openings in said cross bar and forming bearings engageable with said cross bar in substantial horizontal alignment with said first-mentioned bearings, and means engaging said side frames and cross bar for adjusting said side frames with said tension members longitudinally of said cross bar.

In testimony whereof I affix my signature.

WILLIAM E. BEE.